US008707359B2

(12) United States Patent
Prodan et al.

(10) Patent No.: US 8,707,359 B2
(45) Date of Patent: *Apr. 22, 2014

(54) METHOD AND SYSTEM FOR PROVIDING PROGRAM PREVIEW OF A PARTICULAR PROGRAM DURING CHANNEL CHANGES VIA A GATEWAY

(75) Inventors: Rich Prodan, Niwot, CO (US); Jeyhan Karaoguz, Irvine, CA (US); Xuemin Chen, San Diego, CA (US); Wael William Diab, San Francisco, CA (US); David Garrett, Tustin, CA (US); David Lundgren, Mill Valley, CA (US)

(73) Assignee: Broadcom Corporation, Irvine, CA (US)

( * ) Notice: Subject to any disclaimer, the term of this patent is extended or adjusted under 35 U.S.C. 154(b) by 261 days.

This patent is subject to a terminal disclaimer.

(21) Appl. No.: 12/981,733

(22) Filed: Dec. 30, 2010

(65) Prior Publication Data

US 2011/0302612 A1 Dec. 8, 2011

Related U.S. Application Data

(60) Provisional application No. 61/351,696, filed on Jun. 4, 2010.

(51) Int. Cl.
*G06F 3/00* (2006.01)
*G06F 13/00* (2006.01)
*H04N 5/445* (2011.01)
*H04N 7/173* (2011.01)

(52) U.S. Cl.
USPC .................. 725/40; 725/38; 725/39; 725/42; 725/54; 725/56; 725/57; 725/59; 725/61; 725/118

(58) Field of Classification Search
USPC ............ 725/40, 38, 39, 42, 54, 56, 57, 59, 61
See application file for complete search history.

(56) References Cited

U.S. PATENT DOCUMENTS

| | | | |
|---|---|---|---|
| 5,231,664 A * | 7/1993 | Bestler et al. ................. | 380/241 |
| 5,682,597 A * | 10/1997 | Ganek et al. ................. | 455/3.04 |
| 7,631,331 B2 * | 12/2009 | Sie et al. ........................ | 725/46 |
| 8,151,301 B2 * | 4/2012 | Bennett ........................ | 725/41 |
| 2002/0044103 A1 * | 4/2002 | Paulson ........................ | 345/1.1 |
| 2002/0059616 A1 * | 5/2002 | Vasilevsky et al. ............ | 725/78 |
| 2003/0005429 A1 * | 1/2003 | Colsey .............................. | 725/8 |
| 2004/0181813 A1 * | 9/2004 | Ota et al. ...................... | 725/131 |
| 2004/0205816 A1 * | 10/2004 | Barrett .......................... | 725/49 |
| 2005/0229210 A1 * | 10/2005 | Akhavan et al. ............... | 725/43 |
| 2007/0118872 A1 * | 5/2007 | Song et al. .................... | 725/135 |
| 2007/0174870 A1 * | 7/2007 | Nagashima et al. ........... | 725/40 |

(Continued)

*Primary Examiner* — Hoang-Vu A Nguyen-Ba
(74) *Attorney, Agent, or Firm* — Thomas Horstemeyer, LLP

(57) ABSTRACT

A broadband gateway, which enables communication with a plurality of devices and handles at least one physical layer connection to at least one corresponding network access service provider, may be operable to receive one or more programs in preview formats from one or more program sources. Each of the one or more programs may be specified in a list. The programs specified in the list may be from different program sources. The broadband gateway may process the received one or more programs in the preview formats for presentation to one or more of the plurality of devices. The processed one or more programs in the preview formats may be communicated by the broadband gateway to the one or more of the plurality of devices, via a programming guide, for program preview by one or more users during program selections from the list.

20 Claims, 4 Drawing Sheets

(56) References Cited

U.S. PATENT DOCUMENTS

| | | | |
|---|---|---|---|
| 2008/0092203 A1* | 4/2008 | Bouazizi et al. | 725/135 |
| 2008/0115182 A1* | 5/2008 | van Willigenburg | 725/110 |
| 2009/0125945 A1* | 5/2009 | Lee et al. | 725/46 |
| 2010/0037267 A1* | 2/2010 | Bennett | 725/56 |
| 2010/0306806 A1* | 12/2010 | Kim et al. | 725/61 |
| 2011/0061084 A1* | 3/2011 | Bejerano et al. | 725/109 |
| 2011/0162010 A1* | 6/2011 | Ellis et al. | 725/40 |
| 2012/0254421 A1* | 10/2012 | Gagliardi et al. | 709/224 |

* cited by examiner

METHOD AND SYSTEM FOR PROVIDING PROGRAM PREVIEW OF A PARTICULAR PROGRAM DURING CHANNEL CHANGES VIA A GATEWAY

CROSS-REFERENCE TO RELATED APPLICATIONS/INCORPORATION BY REFERENCE

This patent application makes reference to, claims priority to, and claims benefit from U.S. Provisional Application Ser. No. 61/351,696, which was filed on Jun. 4, 2010.

This application also makes reference to:
U.S. patent application Ser. No. 12/355,377 filed on Jan. 16, 2009;
U.S. patent application Ser. No. 12/355,413 filed on Jan. 16, 2009;
U.S. patent application Ser. No. 12/355,480 filed on Jan. 16, 2009;
U.S. patent application Ser. No. 12/395,383 filed on Feb. 27, 2009;
U.S. patent application Ser. No. 12/982,321 filed on Dec. 30, 2010;
U.S. patent application Ser. No. 12/982,355 filed on Dec. 30, 2010;
U.S. patent application Ser. No. 12/981,971 filed on Dec. 30, 2010;
U.S. patent application Ser. No. 12/981,933 filed on Dec. 30, 2010;
U.S. patent application Ser. No. 12/982,216 filed on Dec. 30, 2010;
U.S. patent application Ser. No. 12/982,433 filed on Dec. 30, 2010;
U.S. patent application Ser. No. 12/982,205 filed on Dec. 30, 2010;
U.S. patent application Ser. No. 12/982,353 filed on Dec. 30, 2010;
U.S. patent application Ser. No. 12/981,966 filed on Dec. 30, 2010;
U.S. patent application Ser. No. 12/982,453 filed on Dec. 30, 2010;
U.S. patent application Ser. No. 12/982,172 filed on Dec. 30, 2010;
U.S. patent application Ser. No. 12/982,429 filed on Dec. 30, 2010;
U.S. patent application Ser. No. 12/981,990 filed on Dec. 30, 2010;
U.S. patent application Ser. No. 12/982,442 filed on Dec. 30, 2010;
U.S. patent application Ser. No. 12/982,000 filed on Dec. 30, 2010;
U.S. patent application Ser. No. 12/982,010 filed on Dec. 30, 2010;
U.S. patent application Ser. No. 12/982,022 filed on Dec. 30, 2010;
U.S. patent application Ser. No. 12/981,986 filed on Dec. 30, 2010;
U.S. patent application Ser. No. 12/982,236 filed on Dec. 30, 2010;
U.S. patent application Ser. No. 12/982,091 filed on Dec. 30, 2010;
U.S. patent application Ser. No. 12/982,213 filed on Dec. 30, 2010;
U.S. patent application Ser. No. 12/982,166 filed on Dec. 30, 2010;
U.S. patent application Ser. No. 12/982,340 filed on Dec. 30, 2010;
U.S. patent application Ser. No. 12/982,073 filed on Dec. 30, 2010;
U.S. patent application Ser. No. 12/982,501 filed on Dec. 30, 2010
U.S. patent application Ser. No. 12/982,206 filed on Dec. 30, 2010;
U.S. patent application Ser. No. 12/982,440 filed on Dec. 30, 2010;
U.S. patent application Ser. No. 12/982,171 filed on Dec. 30, 2010;
U.S. patent application Ser. No. 12/982,223 filed on Dec. 30, 2010;
U.S. patent application Ser. No. 12/982,305 filed on Dec. 30, 2010;
U.S. patent application Ser. No. 12/982,477 filed on Dec. 30, 2010;
U.S. patent application Ser. No. 12/982,331 filed on Dec. 30, 2010;
U.S. patent application Ser. No. 12/982,036 filed on Dec. 30, 2010;
U.S. patent application Ser. No. 12/982,196 filed on Dec. 30, 2010;
U.S. patent application Ser. No. 12/982,391 filed on Dec. 30, 2010;
U.S. patent application Ser. No. 12/982,405 filed on Dec. 30, 2010;
U.S. patent application Ser. No. 12/981,753 filed on Dec. 30, 2010; and
U.S. patent application Ser. No. 12/982,414 filed on Dec. 30, 2010.

Each of the above stated applications is hereby incorporated herein by reference in its entirety.

FIELD OF THE INVENTION

Certain embodiments of the invention relate to communication systems. More specifically, certain embodiments of the invention relate to a method and system for providing channel changes via a gateway.

BACKGROUND OF THE INVENTION

Telecommunication technologies have evolved from analog to digital technologies, and continues to evolve from circuit switched to packet switched, from connection oriented packet switching to connectionless packet switching, and from narrow band application to broadband applications. The accompanied evolution in telecommunication technologies has significantly advanced operators' capability to offer broadband, IP-based multimedia services ranging from entertainment and lifestyle applications such as mobile TV and mobile payment to professional services such as video conferencing and real-time data exchange.

With the continuous growth of digital television or broadcast multimedia, and/or broadband access, which may be used in conjunction with online businesses, social networks, and/or other online services and applications, users may desire having access to a larger number of providers and/or a broader range of content in a manner that is flexible and/or suits the users' lifestyles. Most users connect to the Internet using web browsers running on personal computers (PCs). Furthermore, most households may have one or more display devices that may be used to view television and/or multimedia broadcasts. Television broadcasts may include terrestrial TV, Cable-Television (CATV), satellite TV and/or Internet Protocol television (IPTV) based broadcasts. To ensure against unauthorized reception and/or use of TV and/or multimedia broadcast, service providers may require use of dedicated equipment such as set-top boxes (STBs) that may be used to encrypt broadcast signals communicated from the service providers to generate suitable video and/or audio streams that may be played via televisions and/or other display/playback devices in the household. Furthermore, STBs and/or TVs may support Internet access. Thus, rather than using a computer to access the Internet, a user may find it more convenient to use the flat screen televisions and/or monitors in home networks for the same purpose.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for providing channel changes via a gateway, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Figure 1:
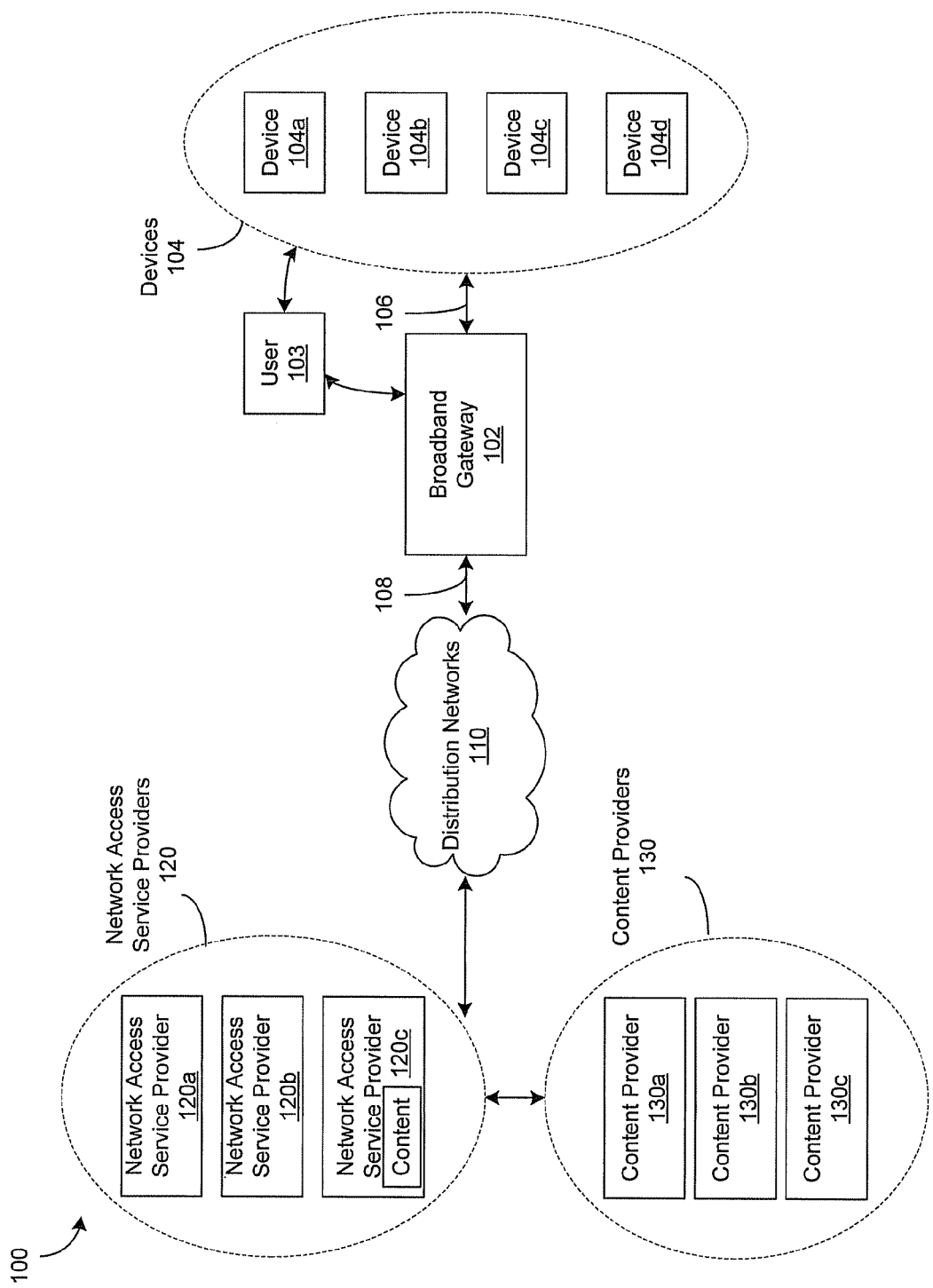
FIG. 1 is a block diagram illustrating an exemplary communication system that is operable to provide channel changes via a gateway, in accordance with an embodiment of the invention.

Certain embodiments of the invention can be found in a method and system for providing channel changes via a gateway. In various embodiments of the invention, a broadband gateway, which enables communication with a plurality of devices and handles at least one physical layer connection to at least one corresponding network access service provider, may be operable to receive one or more programs in preview formats from one or more program sources. Each of the one or more programs may be specified in a list. The broadband gateway may be operable to process the received one or more programs in the preview formats for presentation to one or more of the plurality of devices. The processed one or more programs in the preview formats may be communicated by the broadband gateway to the one or more of the plurality of devices for program preview by one or more users during program selections from the list. In this regard, the broadband gateway may be operable to generate and/or update the list for the user(s) based on program usages history of the user(s) and/or inputs from the user(s). The broadband gateway may communicate the processed one or more programs in the preview formats to the one or more of the plurality of devices associated with the user(s) via a programming guide, for example. The programming guide may comprise channels associated with programs on the list.

The at least one physical layer connection may comprise, for example, a plurality of physical layer connections and the at least one corresponding network access service provider may comprise a plurality of corresponding network access service providers. In this regard, each of the plurality of physical layer connections may correspond to a respective one of the plurality of corresponding network access service providers.

In an exemplary embodiment of the invention, the broadband gateway may be operable to receive the one or more programs in the preview formats from one or more content providers and/or one or more network access service providers. The broadband gateway may also receive the one or more programs in the preview formats from one or more other devices among the plurality of devices which are communicatively coupled to the broadband gateway, for example. In an exemplary embodiment of the invention, the one or more programs in the preview formats, which may be received for the processing, may be stored locally in the broadband gateway.

The broadband gateway may be operable to communicate specific information to the one or more content providers and/or the one or more network access service providers for receiving the one or more programs in the preview formats from the one or more content providers and/or the one or more network access service providers. In this regard, the specific information may comprise, for example, CODEC usage, picture resolution, frame bit rate and/or other characteristics associated with each of the one or more programs in the preview formats. During communications or interactions between the broadband gateway and the one or more program sources for receiving the one or more programs in the preview formats from the one or more program sources, the broadband gateway may be operable to utilize one or more specific protocols. In this regard, the one or more specific protocols may define standard data formats for channel characteristics, network transport characteristics, video coding parameters, physical layer interface characteristics and/or power requirements, for example.

FIG. 1 is a block diagram illustrating an exemplary communication system that is operable to provide channel changes via a gateway, in accordance with an embodiment of the invention. Referring to FIG. 1, there is shown a communication system 100. The communication system 100 may comprise a broadband gateway 102, a plurality of distribution networks 110, a plurality of devices 104 of which devices 104a-104d are illustrated, a plurality of network access service providers 120 of which network access service providers 120a-120c are illustrated and a plurality of content providers 130 of which content providers 130a-130c are illustrated. The devices 104a-104d may be serviced by the broadband gateway 102.

A content provider such as the content provider 130a may comprise suitable logic, circuitry, interfaces and/or code that may be operable to generate, capture and/or package content such as, for example, multimedia content that may be distributed to one or more of the devices 104a-104d via one or more of the network access service providers 120a-120c and the broadband gateway 102. The content or program may be, for example, downloadable or streaming, and/or rented or purchased. In an exemplary embodiment of the invention, a content provider such as the content provider 130a may be operable to provide, upon request from the broadband gateway 102, a program in a preview format to the broadband gateway 102. The program in the preview format may be further processed by the broadband gateway 102 to ensure that it is ready for presentation to a device such as the device 104a during program selections by an associated user such as the user 103 of the device 104a.

A network access service provider such as the network access service provider 120a may comprise suitable logic, circuitry, interfaces and/or code that may be operable to provide services using different access technologies to one or more of the devices 104a-104d for end-users via the broadband gateway 102. The services may include, but are not limited to, multimedia, television, Internet, phone, Ethernet, multimedia over coax alliance (MoCA), passive optical network (PON), and/or cellular services, for example. The network access service providers 120a-120c may provide physical layer connections to the broadband gateway 102. Such physical layer connections may then be utilized by the broadband gateway 102 to access content provided by the content providers 130, to access services provided by other service providers, and/or to access an intranet or the Internet at-large. In this regard, "network access service provider" as utilized herein, is distinguished from the more generic term "service provider" which may encompass services other than providing physical layer access. Cable television (CATV) providers, plain old telephone service (POTS) providers, digital subscriber line (DSL) providers, cellular service providers, WiMAX providers and/or satellite providers are examples of the network access service providers 120. In some instances, a network access service provider such as the network access service provider 120c may be a provider that provides both content and services.

In an exemplary embodiment of the invention, a network access service provider such as the network access service provider 120c may be operable to provide, upon request from the broadband gateway 102, a program in a preview format to the broadband gateway 102. The program in the preview format may be further processed by the broadband gateway 102 to ensure that it is ready for presentation to a device such as the device 104a during program selections by an associated user such as the user 103 of the device 104a.

The broadband gateway 102 may comprise suitable logic, circuitry, interfaces and/or code that may be operable to provide an interface and connectivity between one or more of the devices 104a-104d and one or more of the distribution networks 110. For example, the broadband gateway 102 may support configuring and/or using a plurality of broadband connections 108 to the distribution networks 110. The broadband connections 108 may comprise wired and/or wireless connections between the broadband gateway 102 and the distribution networks 110. In this regard, the broadband gateway 102 may be operable to perform and/or provide various services that may pertain to enabling and/or facilitating reception of content such as multimedia content from one or more of the content providers 130a-130c. The content may be delivered through one or more of the network access service providers 120a-120c. The broadband gateway 102 may communicate with various devices 104a-104d using wired, optical and/or wireless communication links 106.

A single broadband gateway such as the broadband gateway 102 may be operable to handle a plurality of physical layer connections to the distribution networks 110, where different ones or portions of the distribution networks 110 may be owned, operated, leased or associated with different ones of the network access service providers 120. A physical layer may refer to an open systems interconnection (OSI) layer 1. In this regard, for example, a first network access service provider such as the network access service provider 120a may provide network access to the broadband gateway 102 via a DSL connection over twisted-pair cabling, and a second network access service provider such as the network access service provider 120b may provide network access to the broadband gateway 102 via a cable television connection over coaxial cabling. In some instances, the broadband gateway 102 may be operable to concurrently communicate over the plurality of physical layer connections provided by the plurality of network access service providers 120a-120c.

The broadband gateway 102 may be located at a residential location such as a home. The broadband gateway 102 may also be located in non-residential location comprising, for example, a commercial building, an office, an office complex, an apartment building and/or a factory. While the broadband gateway 102 may be illustrated as a single and separate device in FIG. 1, the invention may not be so limited. In one embodiment of the invention, some functionalities of the broadband gateway 102 may be implemented in a distributed manner over two or more devices locally and/or remotely. For example, some of the functionalities of the broadband gateway 102 may be implemented within one of the televisions available in the home. Furthermore, the broadband gateway 102 may be implemented as a virtual platform, for example.

In an exemplary embodiment of the invention, the broadband gateway 102 may be operable to receive or acquire one or more programs in preview formats from one or more program sources based on a list of a user such as the user 103 who is associated with one or more of the devices 104a-104d. The broadband gateway 102 may process the received program previews so as to be ready for presentation to an associated device such as the device 104a. The processed program previews may then be communicated or presented to the device 104a for program preview by the user 103 during program selections from the list of the user 103. In this regard, a program preview may be received from, for example, a content provider such as the content provider 130a, a network access service provider such as the network access service provider 120c and/or one of other devices such as the device 104b. The program preview to be processed may also be stored locally in the broadband gateway 102.

A device such as the device 104a may comprise suitable logic, circuitry, interfaces and/or code that may be operable to interact with the broadband gateway 102. The devices 104a-104d serviced by, and/or connected with the broadband gateway 102 may comprise content consuming devices and/or non-content consuming household devices. For example, the devices 104 may comprise a television, a set-top box (STB), a digital video recorder (DVR), a laptop computer, a tablet PC, a smoke detector, a carbon monoxide detector, a security alarm, a desk top computer and/or server, a mobile phone, a speaker, an AM/FM radio, a phone, and/or an appliance such as a refrigerator. The devices 104a-104d may interact with the broadband gateway 102 via the links 106 utilizing various wired and/or wireless communication technologies such as, for example, Bluetooth, LTE, WiFi and/or Ethernet. One or more of the devices 104a-104d may be associated with a user such as the user 103.

In the exemplary embodiment of the invention illustrated in FIG. 1, although the devices 104a-104d communicate with only the broadband gateway 102 as shown, the invention may not be so limited. Accordingly, the devices 104a-104d may communicate with multiple broadband gateways in a local or home network without departing from the spirit and scope of various embodiments of the invention.

The distribution networks 110 may comprise suitable logic, circuitry, communication devices, interfaces and/or code that may be operable to enable wireless and/or wired communication among a plurality of local and/or remote entities, based on one or more networking and/or communication infrastructures. In this regard, one or more of the distribution networks 110 may be utilized to enable distribution of content such as multimedia content generated by one or more of the content providers 130a-130c, via one or more of the network access service providers 120a-120c, to one or more of the devices 104a-104d. The network connectivity available via the distribution networks 110 may be based on one or more communication standards and/or protocols. The distribution networks 110 may comprise, for example, Internet, cable television (CATV) network, satellite television (TV) network, wired or wireless local area network (LAN), wired or wireless wide area network (WAN), personal area network (PAN) and/or cellular network.

In operation, the broadband gateway 102 may be operable to generate and/or update the list for the user 103. The list of the user 103 may be generated and/or updated automatically and/or periodically based on program usages history of the user 103, for example. In this regard, for example, the broadband gateway 102 may adaptively and transparently keep track of programs viewed more often and at what times they are viewed. Based on the most often watched programs and the times at which they are watched, the list may be generated and/or updated accordingly. The user 103 may also manually add programs to the list and/or delete programs from the list, for example. The programs specified in the list may be from different program sources. In this regard, the broadband gateway 102 may be operable to receive or acquire one or more programs in preview formats from one or more program sources based on the list of the user 103 who is associated with one or more of the devices 104a-104d. The broadband gateway 102 may process each of the received one or more program previews to ensure that it is ready for presentation to an associated device such as the device 104a. In instances when two or more program previews are received, the broadband gateway 102 may concurrently process the received program previews. For example, the broadband gateway 102 may configure program sources and/or decode the received program previews utilizing available resources. The processed program previews may then be communicated or presented to the device 104a via, for example, a programming guide, for program preview by the user 103 during program selections from the list of the user 103. In this regard, since the processed program previews are ready to be presented before a channel change during the program selections and/or previews, the delays associated with steps in the channel change sequence may be avoided or reduced.

Once the user 103 makes a choice to watch a particular program after the program selections and/or previews, the processed program preview of the particular program may be presented by the broadband gateway 102 via a regular or full channel associated with the particular program to the device 104a. The processed program preview of the particular program may be present via the regular or full channel for a short period of time such as, for example, for a few seconds until the time at which the broadband gateway 102 may establish or enable the presentation of the particular program via the regular or full channel to the device 104a.

A program preview or a program in preview format may be received by the broadband gateway 102 from, for example, a content provider such as the content provider 130a and/or a network access service provider such as the network access service provider 120c. In this regard, the broadband gateway 102 may communicate or provide specific information to the content provider 130a and/or the network access service provider 102c so as to receive the program preview in an appropriate format. The specific information may comprise, for example, CODEC usage, picture resolution, frame bit rate and/or other characteristics associated with the program preview.

A program source may also be one of other devices such as the device 104b. In this regard, for example, the broadband gateway 102 may acquire or receive a DVR playback stream from the device 104b. The broadband gateway 102 may then configure the DVR playback at a PAUSE position for preview during the program selections, for example.

The program preview to be processed may also be stored locally in the broadband gateway 102. For example, the program preview may be previously downloaded from the content provider 130a and/or the network access service provider 120c, and stored in the broadband gateway 102 for preview later during the program selections.

During communications or interactions between the broadband gateway 102 and the one or more program sources for receiving the one or more program previews from the one or more program sources, the broadband gateway 102 may utilize one or more specific protocols. In this regard, the one or more specific protocols may define standard data formats for channel characteristics, network transport characteristics, video coding parameters, physical layer interface characteristics and/or power requirements, for example.

Figure 2:
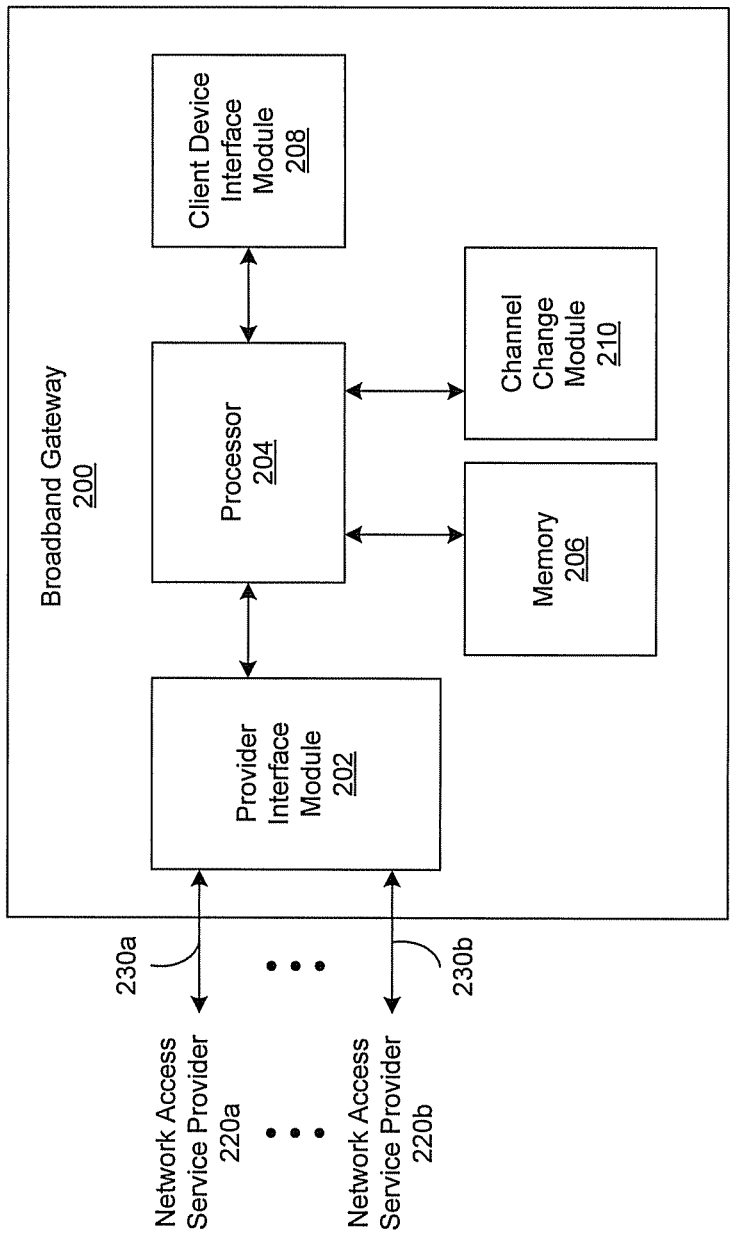
FIG. 2 is a block diagram illustrating an exemplary broadband gateway that is operable to provide channel changes, in accordance with an embodiment of the invention.

FIG. 2 is a block diagram illustrating an exemplary broadband gateway that is operable to provide channel changes, in accordance with an embodiment of the invention. Referring to FIG. 2, there is shown a broadband gateway 200. The broadband gateway 200 may comprise a provider interface module 202, a processor 204, a memory 206, a client device interface module 208 and a channel change module 210. The broadband gateway 200 may be substantially similar to the broadband gateway 102 in FIG. 1.

The provider interface module 202 may comprise suitable logic, circuitry, interfaces and/or code that may be operable to receive data from one or more network access service providers 220a-220b. The provider interface module 202 may also be operable to send data to one or more network access service providers 220a-220b. The provider interface module 202 may be operable to support multiple communication protocols, standards, and/or data transport technologies. The provider interface module 202 may be communicatively coupled to one or more network access service providers 220a-220b via one or more physical layer connections 230a-230b. In this regard, each of the physical layer connections 230a-230b may connect the broadband gateway 200 to one of different network access service providers 220a-220b. Each of the physical layer connections 230a-230b may comprise a wired, optical and/or wireless connection. For example, the physical layer connection 230a may comprise a DSL over twisted-pair connection while the physical layer connection 230b may comprise a CATV over coaxial cable connection.

The processor 204 may comprise suitable logic, circuitry, interfaces and/or code that may be operable to process data received from the network access service providers 220a-120b and/or the content providers 130a-130c and/or data received from one or more of the devices 104a-104d. In this regard, the processor 204 may comprise one or more portions that are suitable to handle certain types of data such as video data and/or audio data, for example.

The channel change module 210 may comprise suitable logic, circuitry, interfaces and/or code that may be operable to provide fast program previews during program selections from a list or program list by a user such as the user 103.

The memory 206 may comprise suitable logic, circuitry, interfaces and/or code that may be operable to store data utilized in the operations of the broadband gateway 200. For example, the memory 206 may be utilized to store configuration data, parameters, device information, tracking and/or monitoring information, security information, and intermediate processing data, for example. In an exemplary embodiment of the invention, the memory 206 may store program preview content which may be downloaded from a content provider such as the content provider 130a and/or a network access service provider such as the network access service provider 120c. The memory 206 may comprise storage media integrated in the broadband gateway 200 and/or a removable storage device.

The client device interface module 208 may comprise suitable logic, circuitry, interfaces and/or code that may be operable to send data to one or more of the devices such as the devices 104a-104d in a local or home network. The client device interface module 208 may also be operable to receive data from one or more of the devices 104a-104d in the local or home network. The client device interface module 208 may be operable to support multiple communication protocols, standards, and/or data transport technologies.

In operation, a broadband gateway such as the broadband gateway 200 may provide connections and/or interfaces for various devices such as the devices 140a-140d to distribution networks such as the distribution networks 110. The channel change module 210 in the broadband gateway 200 may be operable generate and/or update the list or program list for the user 103. The channel change module 210 may be operable to receive or acquire one or more programs in preview formats from one or more program sources based on the list of the user 103 who is associated with one or more of the devices 104a-104d. The channel change module 210 may process the received one or more program previews to ensure that they are ready for presentation to an associated device such as the device 104a. For example, the channel change module 210 may configure program sources and/or cause decoding of the received program previews. The processed one or more program previews may then be communicated or presented by the channel change module 210 to the device 104a via, for example, a programming guide, for program preview by the user 103 during program selections from the list of the user 103.

As soon as the user 103 makes a choice or selection to watch a particular program after the program selections and/or previews, the processed program preview of the particular program may be presented by the channel change module 210 via a regular or full channel associated with the particular program to the device 104a. The processed program preview of the particular program may be present via the regular or full channel for a short period of time such as, for example, for a few seconds until the time at which the processor 204 in the broadband gateway 200 may establish or enable the presentation of the particular program via the regular or full channel to the device 104a.

A program preview or program in preview format may be received by the channel change module 210 from, for example, a content provider such as the content provider 130a and/or a network access service provider such as the network access service provider 220a. In this regard, the channel change module 210 may communicate or provide specific information to the content provider 130a and/or the network access service provider 220a so as to receive the program preview in an appropriate format. The specific information may comprise, for example, CODEC usage, picture resolution, frame bit rate and/or other characteristics associated with the program preview.

The program preview may also be received by the channel change module 210 from one of other devices such as the device 104b. In this regard, for example, the channel change module 210 may acquire or receive a DVR playback stream from the device 104b and put the DVR playback at a PAUSE position for preview during the program selections by the user 103, for example.

The program preview to be processed by the channel change module 210 may actually be stored locally in the memory 206. For example, the program preview may be previously downloaded from the content provider 130a and/or the network access service provider 220a, and stored in the memory 206 for preview later during the program selections by the user 103.

During communications or interactions between the broadband gateway 200 and the one or more program sources for receiving the one or more program previews from the one or more program sources, the processor 204 may utilize one or more specific protocols. In this regard, the one or more specific protocols may define standard data formats for channel characteristics, network transport characteristics, video coding parameters, physical layer interface characteristics and/or power requirements, for example.

Figure 3:
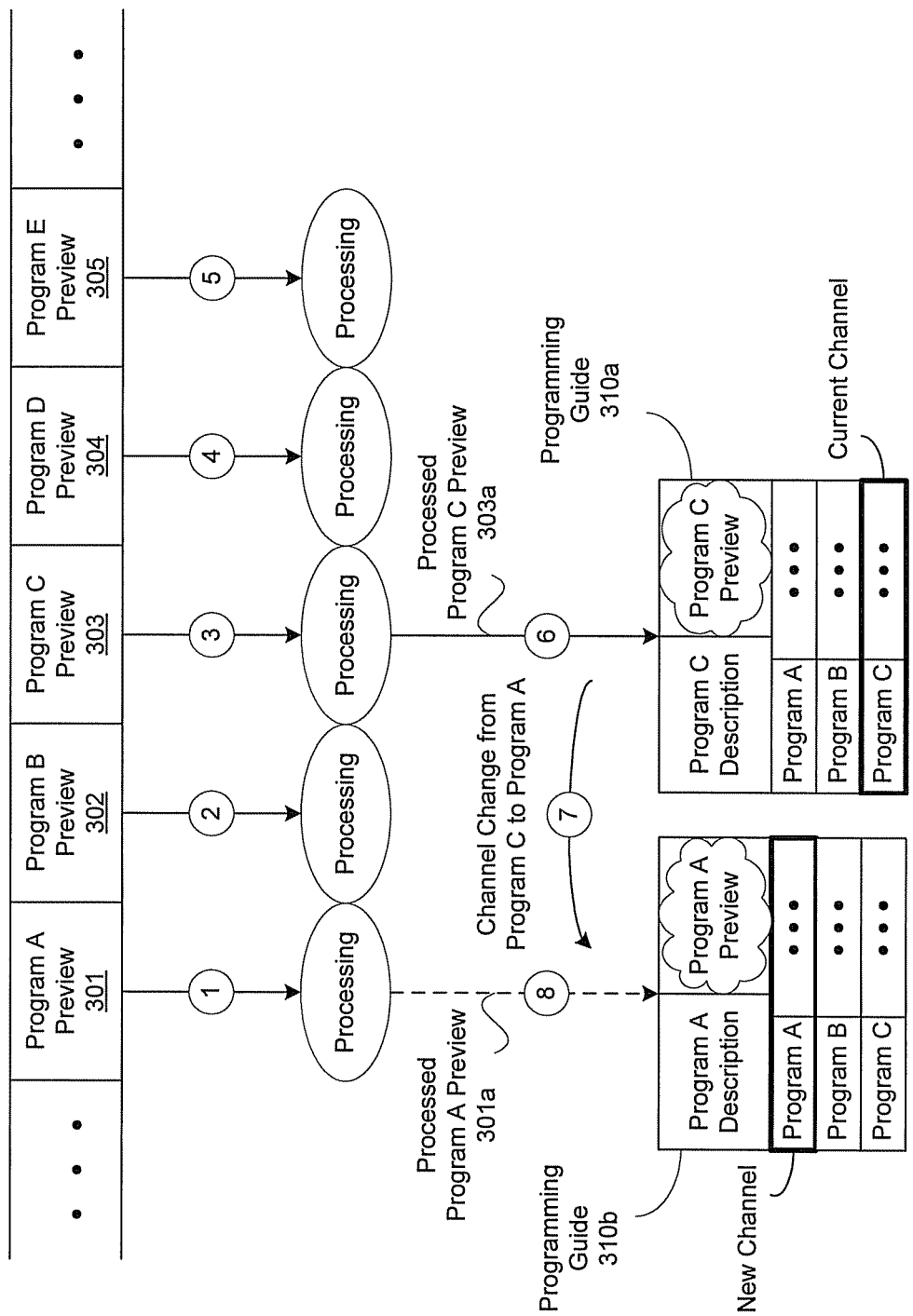
FIG. 3 is a block diagram illustrating an exemplary programming guide for program previews during program selections, in accordance with an embodiment of the invention.

FIG. 3 is a block diagram illustrating an exemplary programming guide for program previews during program selections, in accordance with an embodiment of the invention. Referring to FIG. 3, there is shown a plurality of programs in preview formats such as program A preview 310, program B preview 302, program C preview 303, program D preview 304 and/or program E preview 305. Each of the plurality of programs may be a program on a list of a user such as the user 103 who is associated with one or more of the devices 104a-104d. During program selections, a current channel showing, for example, the program C preview may be viewed by the user 103 via a programming guide as illustrated by the programming guide 310a. A newly selected channel showing, for example, the program A preview may be viewed by the user 103 via the programming guide as illustrated by the programming guide 310b.

In an exemplary embodiment of the invention, the channel change module 210 in the broadband gateway 200 may be operable to concurrently process acquired or received program previews such as the program A preview 301, the program B preview 302, the program C preview 303, the program D preview 304 and the program E preview 305, as illustrated by the reference labels 1-5. During program selections from the list by the user 103, the channel change module 210 may communicate or present the processed program C preview 303a, which is associated with a current channel, to an associated device such as the device 104a via the programming guide 310a, as illustrated by the reference label 6. A channel change from program C to program A may be performed by the channel change module 210 during the program selections, as illustrated by the reference label 7. The channel change module 210 may then present the processed program A preview 301a, which is associated with the newly selected channel, to the device 104a via the programming guide 310b, as illustrated by the reference label 8. In this regard, since the processed program A preview 301a has already been processed by the channel change module 210 and is ready to be presented before the channel change, the delays associated with steps in the channel change sequence may be avoided or reduced.

Figure 4:
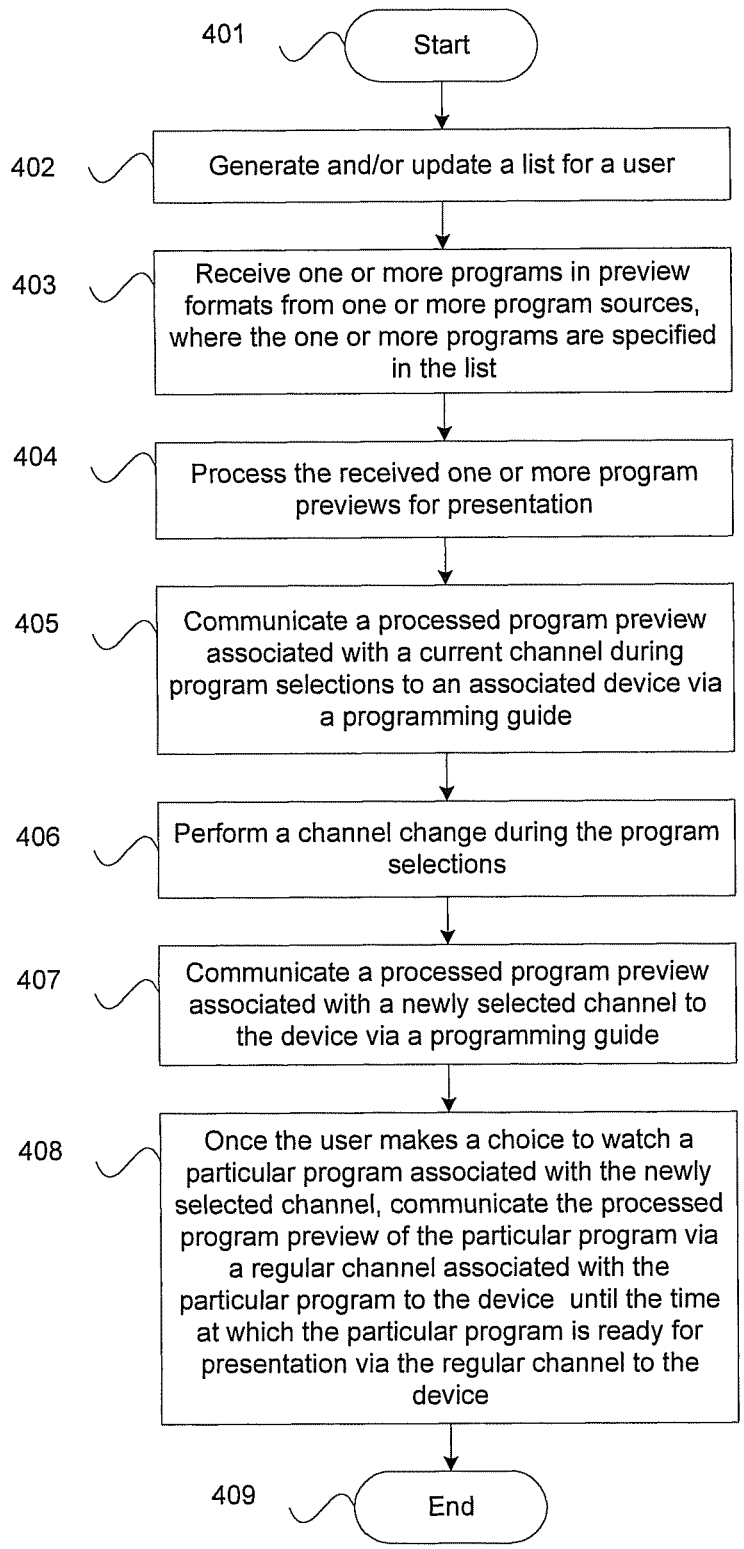
FIG. 4 is a flow chart illustrating exemplary steps for providing channel changes via a gateway, in accordance with an embodiment of the invention.

FIG. 4 is a flow chart illustrating exemplary steps for providing channel changes via a gateway, in accordance with an embodiment of the invention. Referring to FIG. 4, the exemplary steps start at step 401. In step 402, the channel change module 210 in the broadband gateway 200 may be operable to generate and/or update a list or program list for a user such as the user 103. In step 403, the channel change module 210 may be operable to receive or acquire one or more programs in preview formats such as, for example, the program A preview 301, the program B preview 302, the program C preview 303, the program D preview 304 and/or the program E preview 305, from one or more program sources. The one or more programs such as the programs A, B, C, D, E may be specified in the list of the user 103. The user 103 may be associated with one or more of devices such as the devices 104a-104d. In step 404, the received one or more program previews may be processed by the channel change module 210 for presentation to an associated device such as the device 104a. In step 405, the channel change module 210 may communicate or present a processed program preview such as the processed program C preview 303a, which is associated with a current channel during program selections, to an associated device such as the device 104a via, for example, a programming guide such as the programming guide 310a. In step 406, a channel change may be performed by the channel change module 210 during the program selections. In step 407, the channel change module 210 may communicate or present a processed program preview such as the processed program A preview 301a, which is associated with a newly selected channel during program selections, to the device 104a via, a programming guide such as the programming guide 31b.

In step 408, Once the user 103 makes a choice to watch a particular program associated with the newly selected channel, the channel change module 210 may communicate or present the processed program preview of the particular program, such as the processed program A preview 301a, via a regular or full channel associated with the particular program to the device 104a. The processed program A preview 301a may be presented via the regular or full channel until the time at which the particular program is ready for presentation via the regular or full channel to the device 104a. The exemplary steps may proceed to the end step 409.

In various embodiments of the invention, a broadband gateway 102, 200 may enable communication with a plurality of devices 104a-104d and may handle at least one physical layer connection to at least one corresponding network access service provider. In this regard, for example, the at least one physical layer connection may comprise a plurality of physical layer connections 230a-230b and the at least one corresponding network access service provider may comprise a plurality of corresponding network access service providers 220a-220b. Each of the plurality of physical layer connections 230a-230b may correspond to a respective one of the plurality of corresponding network access service providers 220a-220b.

A channel change module 210 in the broadband gateway 200 may be operable to receive one or more programs in preview formats from one or more program sources. Each of the one or more programs may be specified in a list. The channel change module 210 may be operable to process the received one or more programs in the preview formats, such as the program A preview 301, program B preview 302, the program C preview 303, the program D preview 304 and/or the program E preview 305, for presentation to one or more of the plurality of devices 104a-104d. The processed one or more programs in the preview formats, such as the processed program C preview 303a and/or the processed program A preview 301a, may be communicated by the channel change module 210 to one of the associated devices, such as the device 104a, for program preview by a user such as the user 103 during program selections from the list. In this regard, the channel change module 210 may be operable to generate and/or update the list for the user 103 based on program usages history of the user 103 and/or inputs from the user 103. The channel change module 210 may communicate or present the processed one or more programs in the preview formats, such as the processed program C preview 303a and/or the processed program A preview 301a, to the device 104a via a programming guide such as the programming guide 310a or 310b, for example. The programming guide may comprise channels associated with programs on the list.

In an exemplary embodiment of the invention, the channel change module 210 may be operable to receive the one or more programs in the preview formats from one or more content providers 130a-130c and/or one or more network access service providers 220a-220b. The channel change module 210 may also receive the one or more programs in the preview formats from one or more other devices among the plurality of devices 104a-104d which are communicatively coupled to the broadband gateway 200, for example. In an exemplary embodiment of the invention, the one or more programs in the preview formats, which may be received for the processing, may actually be stored locally in the memory 206 in the broadband gateway 200.

The channel change module 210 may be operable to communicate specific information to the one or more content providers 130a-130c and/or the one or more network access service providers 220a-220b for receiving the one or more programs in the preview formats from the one or more content providers 130a-130c and/or the one or more network access service providers 220a-220b. In this regard, the specific information may comprise, for example, CODEC usage, picture resolution, frame bit rate and/or other characteristics associated with each of the one or more programs in the preview formats. During communications or interactions between the broadband gateway 200 and the one or more program sources for receiving the one or more programs in the preview formats from the one or more program sources, the processor 204 in the broadband gateway 200 may be operable to utilize one or more specific protocols. In this regard, the one or more specific protocols may define standard data formats for channel characteristics, network transport characteristics, video coding parameters, physical layer interface characteristics and/or power requirements, for example.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for providing channel changes via a gateway.

Accordingly, the present invention may be realized in hardware, software, or a combination of hardware and software. The present invention may be realized in a centralized fashion in at least one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for communication, the method comprising: in a broadband gateway that enables communication with a plurality of devices, wherein the broadband gateway is operable to handle at least one physical layer connection to at least one corresponding network access service provider:
receiving one or more programs in preview formats from one or more program sources, wherein each of the one or more programs is specified in a list;
processing the one or more programs for presentation to one or more of the plurality of devices;
communicating the processed one or more programs to the one or more of the plurality of devices for program preview by one or more users during program selections from said list; and
utilizing one or more specific protocols during communication between the broadband gateway and said one or more program sources for receiving the one or more programs in said preview formats from said one or more program sources, wherein the one or more specific protocols define standard data formats for channel characteristics, network transport characteristics, video coding parameters, physical layer interface characteristics or power requirements.

2. The method according to claim 1, wherein the at least one physical layer connection comprises a plurality of physical layer connections and the at least one corresponding network access service provider comprises a plurality of corresponding network access service providers, and each of the plurality of physical layer connections corresponds to a respective one of the plurality of corresponding network access service providers.

3. The method according to claim 1, comprising generating or updating said list for the one or more users based on a program usage history of the one or more users or inputs from the one or more users.

4. The method according to claim 1, comprising communicating the processed one or more programs to the one or more of the plurality of devices via a programming guide, wherein the programming guide comprises one or more channels associated with the one or more programs on the list.

5. The method according to claim 1, comprising receiving the one or more programs from one or more content providers.

6. The method according to claim 1, comprising receiving the one or more programs from one or more network access service providers.

7. The method according to claim 1, comprising receiving the one or more programs from one or more other devices among the plurality of devices.

8. The method according to claim 1, wherein the one or more programs are stored locally in the broadband gateway.

9. The method according to claim 1, comprising communicating specific information to one or more content providers or one or more network access service providers for receiving the one or more programs from the one or more content providers or the one or more network access service providers, wherein the specific information comprises CODEC usage, picture resolution, frame bit rate or another characteristic associated with each of the one or more programs.

10. A system for communication, the system comprising:
one or more processors, one or more circuits, or any combination thereof configured for use in a broadband gateway that enables communication with a plurality of devices, the broadband gateway being operable to handle at least one physical layer connection to at least one corresponding network access service provider, and the one or more processors, one or more circuits, or any combination thereof configured to:
receive one or more programs in preview formats from one or more program sources, wherein each of the one or more programs is specified in a list;
process the received one or more programs for presentation to one or more of the plurality of devices;
communicate the processed one or more programs to the one or more of the plurality of devices for program preview by one or more users during program selections from the list; and
communicate specific information to one or more content providers or one or more network access service providers for receiving the one or more programs from the one or more content providers or the one or more network access service providers, and the specific information comprises CODEC usage, picture resolution, frame bit rate or other characteristics associated with each of the one or more programs.

11. The system according to claim 10, wherein the at least one physical layer connection comprises a plurality of physical layer connections and the at least one corresponding network access service provider comprises a plurality of corresponding network access service providers, and each of the plurality of physical layer connections corresponds to a respective one of the plurality of corresponding network access service providers.

12. The system according to claim 10, wherein the one or more processors, one or more circuits, or any combination thereof are operable to generate or update the list for said one or more users based on a program usage history of the one or more users or inputs from the one or more users.

13. The system according to claim 10, wherein the one or more processors, one or more circuits, or any combination thereof are configured to communicate the processed one or more programs in the preview formats to the one or more of the plurality of devices via a programming guide, and the programming guide comprises channels associated with the one or more programs in the list.

14. The system according to claim 10, wherein the one or more processors, one or more circuits, or any combination thereof are configured to receive the one or more programs from one or more content providers.

15. The system according to claim 10, wherein the one or more processors, one or more circuits, or any combination thereof are configured to receive the one or more programs from one or more network access service providers.

16. The system according to claim 10, wherein the one or more processors, one or more circuits, or any combination thereof are configured to receive the one or more programs from one or more other devices among the plurality of devices.

17. The system according to claim 10, wherein the one or more programs are stored locally in the broadband gateway.

18. A non-transitory computer readable medium having a program that, when executed by processing circuitry, causes the processing circuitry to:
   receive one or more programs in preview formats from one or more program sources, wherein each of the one or more programs is specified in a list;
   concurrently process the one or more programs for presentation to one or more of a plurality of devices;
   communicating the processed one or more programs to the one or more of the plurality of devices for program preview by one or more users during program selections from said list; and
   communicate to the one or more program sources, via one or more specific protocols, standard data formats for channel characteristics, network transport characteristics, video coding parameters, physical layer interface characteristics or power requirements.

19. The non-transitory computer readable medium of claim 18, wherein the program, when executed by the processing circuitry, causes the processing circuitry to further:
   communicate specific information to the one or more program sources, wherein the specific information comprises CODEC usage, picture resolution, frame bit rate or other characteristics associated with each of the one or more programs.

20. The non-transitory computer readable medium of claim 18, wherein the program, when executed by the processing circuitry, causes the processing circuitry to further:
   generate or update the list for the one or more users based on a program usage history of the one or more users or inputs from the one or more users.

* * * * *